Patented Sept. 8, 1953

2,651,628

UNITED STATES PATENT OFFICE 2,651,628

PROCESS FOR ALKYLATING POLYSTYRENE

Lester Marshall Welch, Madison, N. J., assignor to Standard Oil Development Company, a corporation of Delaware No Drawing. Application September 26, 1950, Serial No. 186,917

4 Claims. (Cl. 260—93.5)

This invention relates to lubricating oil additive materials and their process of manufacture. Particularly the invention relates to a process for the formation of lubricating oil additive materials having the desirable characteristic of depressing the pour point of lubricating oil into which they have been incorporated. More particularly the invention relates to the manufacture of pour point depressants by the alkylation of polystyrene, the conditions of alkylation being carefully controlled so as to obtain an alkylated polystyrene within a specific range of molecular weights.

Mineral lubricating oils containing paraffin wax therein have the characteristic of becoming less fluid as the temperature decreases. This loss of fluidity is due to the crystallization of the combined wax into needle-like crystals which eventually form a spongy mass entrapping the lubricating oil therein. The lowest temperature at which a waxy mineral lubricating oil retains its flow characteristics is known in the art as the "pour point."

It has long been known that various compositions act as crystalline modifiers when blended with waxy mineral lubricating oils. These compositions, it is believed, inhibit the formation of the needle-like wax crystals as the temperature of the oil blend is lowered and permit the oil to remain fluid at lower temperature. They are known to the lubricating art as "pour point depressors" in that they lower the limiting temperature at which the oil maintains its free flow characteristics.

Various pour point depressors have been described in the literature. Among them may be mentioned the condensation product of naphthalene and chlorinated wax, polymerized acrylate and methacrylate esters, and other materials which are very satisfactory under certain operating conditions.

It is known in the art, and described in literature, that polymerized styrene of varying molecular weights may be alkylated to form materials useful as lubricating oil thickeners or viscosity index improvers. For instance, in U. S. Patent 2,072,120 issued on March 2, 1937 to Mikeska and Fulton there is described a method of preparation of an alkylated polystyrene useful as an oil thickener. This patent teaches that products with a wide range of molecular weights may be used for thickeners and that the degree of alkylation involved may be from 10% to 50%. In British Patents 640,566/7 issued in 1947, there is also disclosed that polymerized styrene having a wide range of molecular weights may be alkylated to give viscosity index improvers. The alkylating agent disclosed as operable in these patents is a fraction of a polymerized propylene stream or polypropylene.

It has now been found and forms the object of this invention that a polymerized styrene composition may be alkylated with certain straight chain alkylating agents and under controlled alkylating conditions to form alkylated polystyrenes having outstanding ability to depress the pour point of waxy mineral lubricating oils. So far as is known this is the first disclosure of an alkylated polystyrene having this outstanding pour point depressing potency.

To obtain products having the desired pour point depressing potency, it is essential that three conditions be met. These conditions are:

(1) The alkylating agent must consist of straight aliphatic hydrocarbon chains containing from 16 to 20 carbon atoms.

(2) The polystyrene must be alkylated to a degree between 75% and 100%, that is to say, between 75% and 100% of the benzene neuclei in the final product must carry alkylation groups, and (3) The final product must have a molecular weight within a range of from 6,000 to 18,000 Staudinger.

These conditions are explained more in detail below.

Briefly stated, the pour point depressants of this invention are formed by dissolving a polymerized styrene of suitable molecular weight in a polar diluent that is inert under the reaction conditions experienced. To this solution of polystyrene is added the desired amount of Friedel-Crafts catalyst, usually in solid form. During the addition of the catalyst the reaction mixture is cooled externally. The desired alkylating agent is then added slowly with constant agitation, the addition generally taking from ½ to 2 hours. After the alkylating agent is completely added, the temperature of the reaction mixture is maintained at one within a range of from about 45° F. to about 60° F. for about 1 to 3 hours. This period, the initial reaction period, is carefully controlled so as to bring about the desired degree of alkylation. Preferably one long chain alkyl group per styrene unit or 100% alkylation is the degree desired for optimum pour depressant activity, however, as set out above alkylation to the extent of 75% produces useful activity. After this has been accomplished the reaction temperature is allowed to rise from 10° F. to 20°

F. and maintained at this temperature for an additional ½ to 2 hours. This final reaction period is also carefully controlled to bring about the formation of a product having the desired molecular weight, that is, a molecular weight of between 6,000 and 18,000 Staudinger, with a molecular weight of between 8,000 and 16,000 being especially preferred. The final product is then purified by any of the various methods known to the art such as precipitation from the reaction mixture by the use of acetone, and further purified by dissolving the precipitate in benzene and reprecipitating.

In the description given above, the preferred method of arriving at the potent pour depressors of this invention is set out. It is to be understood, of course, as is well known in the art, that these reaction conditions are designed to bring about a product having a molecular weight within the desired range and attaining the desired degree of alkylation. Modifications of this specific procedure may also be made without departing from the spirit of this invention. By controlling catalyst activity (for example, by the use of such diluents or catalyst modifiers such as nitrobenzene and the like), the rate and degree of alkylation may be modified. By varying the temperature conditions, changes in final product molecular weights may be obtained. For instance, the use of lower initial temperature will result in a product having a higher molecular weight. It is essential that the final pour point depressant have a molecular weight within a range of from 6,000 to 18,000 Staudinger and contain straight carbon chains having from 14 to 20 carbon atoms as set out above. These products are prepared advantageously by the use of the procedure outlined in the preferred embodiment.

It is preferred that the polystyrene to be alkylated have a molecular weight sufficiently high that the unavoidable degradation of molecular weight due to reaction conditions results in a final product having a molecular weight within a range of from about 6,000 to about 18,000 Staudinger. In order to accomplish this under normal temperature conditions it has been found that a polystyrene having a molecular weight within a range of from about 25,000 to 45,000 Staudinger, preferably 30,000 to 40,000 will give a desirable final product.

It is essential that a solvent be chosen which will dissolve the polystyrene and at the same time remain unreactive. Although it is preferred to use tetrachloroethylene or o-dichlorobenzene in the instant invention, other known unreactive polar solvents such as carbon disulfide, p-dichlorobenzene, chlorobenzene, nitrobenzene, and the like may be used. The amount of the solvent used is not critical, it being essential only that sufficient solvent is used so that the viscosity of the system permits ease in handling.

The preferred catalyst is solid aluminum chloride. However, Friedel-Crafts catalyst such as HF, $AlBr_3$, $AlCl_2Br$, $AlClBr_2$, etc., may be used. The amount of the catalyst utilized will depend on reaction conditions and on the amount of alkylating agent used. Normally, however, from 10 wt. % to 100 wt. % of the catalyst based on the polystyrene will give the desired catalytic action.

In the preferred embodiment the alkylating agent is a normal alpha olefin containing from 16 to 20 carbon atoms. Pure olefins, such as hexadecene, octadecene and the like result in a final product having outstanding pour point depressing potencies. Commercially, however, it is advantageous to use mixtures of olefins such as those obtained by the thermal cracking of paraffin wax or from such processes as the hydrocarbon synthesis process. The more narrow the cut of the olefin stream, the more potent the product obtained. For example, a $C_{17}$–$C_{21}$ cut will result in a product more potent than a $C_{14}$–$C_{22}$ cut using the same reaction conditions. To obtain optimum results it is desirable that the olefin be used in molar quantities approximately equal to the mols of polystyrene used, in other words, to obtain a product which has a degree of alkylation of approximately 100%. Lesser quantities of the alkylating agent may be used, that is to say, such that the degree of alkylation is between 75% and 100%.

Although as was explained above, it is desirable that the initial reaction be maintained at a temperature within a range of from 30 to 60° F. for about 1 to 3 hours and the final reaction be maintained for from ½ to 2 hours at a temperature within a range of from 65° F. to 75° F. These reaction conditions are preferred although they may be modified somewhat without departing from the inventive concept. During the initial reaction the majority of the alkylation occurs and as the alkylation proceeds it becomes necessary to raise the temperature to fully alkylate the polystyrene. By modifying the catalyst activity, higher temperature may be used in the initial reaction and longer reaction times may be used.

The outstanding pour depressants of this invention may be blended with any of the waxy mineral oils in use in the lubricating field, prepared by any of the well known refining techniques. A blend containing from 0.005% to 5% by weight may be used, but most oils require less than 0.10% of these very active materials to lower the pour point to the desired level. It may also be desirable to use the pour depressants of this invention to form concentrates in a base stock in order to facilitate handling and storage. These pour depressants form concentrates containing up to 80% of the additive materials without loss of any pour point depressant potency.

To more exactly illustrate the above described invention, the following examples are given. These examples, of course, are selected from the broad range of the disclosure and do not limit in any way the inventive concept.

*Example I*

A solution of polystyrene (30,000 molecular weight Staudinger) was prepared by slowly adding 25 gr. of polystyrene powder to 400 ml. of tetrachloroethylene at room temperature. To the above solution 25 gr. of solid $AlCl_3$ was added and the reaction flask cooled to 45° F. Over a period of 2 hours 60 gr. of octadecene-1 was added under conditions of good agitation. The reaction temperature was held between 45° F. and 60° F. After the 2 hour initial reaction period the reaction mixture was allowed to warm up to 75° F. where it was held for 1½ hours more to complete the reaction. After quenching with alcohol, the polymeric product was recovered by precipitation from reaction mixture using acetone and was then further purified by dissolving the crude polymeric product in benzene and reprecipitating. 55 gr. of purified product was obtained representing 65% of the theoretical amount. The product had a molecular weight of 9,750 Staudinger. Carbon and hydrogen analysis showed that the degree of alkylation was 100%.

Example II 8.3 grs. of polystyrene (30,000 molecular weight Staudinger) was dissolved in 233 ml. of tetrachloroethylene. There was then added to this solution 8.3 gr. of solid aluminum chloride and the mixture cooled by external cooling to 35° F. 20 gr. of octadecene-1 was added slowly over a period of about 2 hours, the reaction temperature being held to about 35° F. After this initial reaction period the reaction mixture was allowed to warm to 68° F. and allowed to remain at that temperature for about 1 hour. The product was then purified as described in Example I above, and 15 gr. or 53% of theoretical was recovered. The product had a molecular weight of 16,750 Staudinger. Carbon and hydrogen analysis showed that the degree of alkylation was 75%.

Example III

In an experiment similar to Example II above, the mole ratio of the olefin to styrene was reduced to 0.5 to 1, that is, 10 gr. of octadecene-1 was used to alkylate 8.3 gr. of polystyrene (30,000 molecular weight) using 233 ml. of tetrachloroethylene as solvent and 8.3 gr. of $AlCl_3$ catalyst. The final product yield was 95% indicating approximately 0.5 alkyl unit per styrene unit, or a degree of alkylation of 50%. The molecular weight of the polymer product was 11,000 Staudinger.

Example IV

To a solution of 8.3 gr. of polystyrene (molecular weight 30,000 Staudinger) in 233 ml. of tetrachloroethylene, there was added 8.3 gr. of solid aluminum chloride. The solution was then cooled with external cooling to about 55° F. There was then added over a period of about 3 hours with agitation, 20 gr. of octadecene-1. After the initial reaction period the product was purified by the procedure described in Example I. 25 gr. of the purified product or 89% of the theoretical yield was obtained. The molecular weight of the product was 21,400 Staudinger and the carbon-hydrogen analysis indicated a degree of alkylation of approximately 100%.

Example V 8.3 gr. of polystyrene (30,000 molecular weight Staudinger) was dissolved in 230 ml. of $CS_2$. To this solution was added 8.3 gr. of solid aluminum chloride and the solution cooled externally to 50° F. 20 gr. of octadecene-1 was slowly added to the solution and the initial reaction period maintained for 2 hours. The reaction mixture was then allowed to warm to about 70° F. and maintained at this temperature for about 1 hour. The reaction was then quenched and 22 gr. (75% of theory) of the product was obtained by the purification procedure described in Example I. The molecular weight of the product was 12,000 Staudinger. Carbon-hydrogen analysis indicated a degree of alkylation of 100%.

Example VI 25 gr. of polystyrene (30,000 molecular weight Staudinger) was dissolved in 400 ml. of o-dichlorobenzene. To this solution was added 5 gr. of solid aluminum chloride. 60 gr. of octadecene-1 was added to this solution over a period of about 2 hours, the reacting being maintained at 90° F. The temperature was then allowed to raise to 100° F. and maintained there for one hour. There was obtained 76.5 gr. of product (90% theoretical) having a molecular weight of 2,450 Staudinger. The carbon-hydrogen analysis indicated a degree of alkylation of 100%.

Example VII

To a solution of 8.3 gr. of polystyrene, 30,000 molecular weight Staudinger, in 230 ml. of tetrachloroethylene, there was added 8.3 gr. of aluminum chloride. 18 gr. of hexadecene-1 was added to the solution over a period of about 2 hours, the temperature being maintained at approximately 35° F. The temperature of the reaction mixture was then allowed to increase to 65° F. and was maintained there for one hour. There was obtained 16 gr. or approximately 61% of the theoretical yield of a product by the purification procedure of Example I. The product had a molecular weight of 12,400 Staudinger and carbon-hydrogen analysis indicated a degree of alkylation of approximately 97%.

Example VIII 8.3 gr. of polystyrene (15,000 molecular weight Staudinger) was dissolved in 230 ml. of tetrachloroethylene. To this solution was added 8.3 gr. of solid aluminum chloride and the temperature of the solution cooled externally to 35° F. 18 gr. of hexadecene-1 was slowly added over a period of about 2 hours. The temperature was then allowed to increase to 65° F. and maintained there for one hour. There was obtained 21 gr. (80% of theoretical) of a product according to the purification procedure of Example I. The molecular weight of the product was 4,000 Staudinger and carbon-hydrogen analysis indicated a degree of alkylation of about 98%.

Example IX 8.3 gr. of polystyrene was dissolved in 230 ml. of tetrachloroethylene. To this solution was added 8.3 gr. of HF and the temperature maintained at −32° F. Over a period of 2 hours 20 gr. of dodecene-1 was added with agitation. The reaction temperature was then allowed to raise to 0° F. and maintained there for one hour. The product was purified according to the procedure outlined in Example I and approximately 25 gr. obtained. The molecular weight of the product was 15,000 Staudinger and carbon-hydrogen analysis indicated a degree of alkylation of approximately 100%.

Example X

In 200 ml. of o-dichlorobenzene there was dissolved 12.5 gr. of polystyrene (30,000 molecular weight Staudinger). 5 grs. of solid aluminum chloride was then added and the temperature of the mixture maintained at 50° F. 40 gr. of a $C_{15}$–$C_{21}$ cut of polypropylene was added to the cooled solution over a period of about 2 hours. The temperature was then allowed to raise to 55° F. for an additional one hour period and the product recovered in the usual manner. 20 gr. (38% of theoretical) of product having a molecular weight of 14,000 Staudinger was recovered. Carbon-hydrogen analysis indicated a degree of alkylation of approximately 100%.

Example XI

To a solution of 8.3 gr. of polystyrene (30,000 molecular weight Staudinger) in 230 ml. of tetrachloroethylene there was added 8.3 gr. of solid aluminum chloride. The temperature was cooled to 35° F. and 20 gr. of $C_{19}$–$C_{20}$ cut of cracked wax olefins was added over a period of 2 hours. The temperature was then allowed to increase to 60° F. and maintained there for one hour. The product, purified according to the procedure of Example I above, was 20 gr. or 71% of theoretical. The molecular weight was 37,500 Staudinger and analysis showed a degree of alkylation of approximately 100%.

Example XII

To a solution of 8.3 gr. of polystyrene (30,000 molecular weight Staudinger) in 230 ml. of tetrachloroethylene there was added 8.3 gr. of aluminum chloride. The temperature was adjusted to 50° F. and maintained at that temperature for three hours during which time 20 gr. of a $C_{19}$ cut of cracked wax olefins were added with agitation. After the initial period the temperature was allowed to rise to 70° F. and maintained at that temperature for one hour. Using the purification procedure in Example I, 16 gr. or 57% of theoretical of the product having a molecular weight of 8,750 Staudinger was obtained. Carbon-hydrogen analysis indicated a degree of alkylation or about 98%.

Example XIII 8.3 gr. of polystyrene (30,000 molecular weight Staudinger) was dissolved in 230 ml. of tetrachloroethylene. 8.3 gr. of solid aluminum chloride was added to the solution and the solution cooled to 30° F. 20 gr. of a $C_{17}$–$C_{21}$ cut of cracked wax olefins was then added over a period of three hours. After the initial reaction period the temperature was allowed to raise to 70° F. and maintained at that temperature for an additional one hour. 24 gr. or 85% of theoretical of a product was obtained by the procedure described in Example I. The product had a molecular weight of 11,000 Staudinger and a carbon-hydrogen analysis indicated a degree of alkylation of approximately 100%.

The products obtained in Examples I through XIII above were blended with Mid-Continent petroleum distillates of SAE 10, 20 and 30 grades in varying percentage concentrations. These oil blends were submitted to the standard ASTM pour point test to determine the pour depressing potency of the blends. The results of these tests are set out in Table I below.

TABLE I

*Alkylated polystyrene pour depressants*

| Ex. No. | Mol. Wt. of Polystyrene | Alkylating Agent | Solvent Used | F-C Catalyst Used | Initial Reaction Temp. (° F.) | Final Reaction Temp. (° F.) | Percent Alkylation | Product, Mol. Wt. | Concentra., Wt. Percent | ASTM Pour Point Data (° F.) Mid Cont. Oil, SAE | | |
|---|---|---|---|---|---|---|---|---|---|---|---|---|
| | | | | | | | | | | 10 | 20 | 30 |
| I | 30,000 (25 g.). | octadecene-1 (60 g.). | tetrachloroethylene (400 ml.). | AlCl₃ (25 g.). | 45–60 (2 hrs.). | 75 (1 hr.). | 100 | 9,750 | None | 5 | 10 | 15 |
| | | | | | | | | | 0.01 | −30 | −30 | −20 |
| | | | | | | | | | 0.03 | −35 | −35 | −25 |
| | | | | | | | | | 0.05 | −35 | −35 | −35 |
| II | 30,000 (8.3 g.). | octadecene-1 (20 g.). | tetrachloroethylene (233 ml.). | AlCl₃ (8.3 g.). | 35 (2 hrs.). | 65 (1 hr.). | 75 | 16,750 | 0.01 | −5 | 0 | 5 |
| | | | | | | | | | 0.03 | −15 | −10 | −10 |
| | | | | | | | | | 0.05 | −20 | −20 | −10 |
| III | do | octadecene-1 (10 g.). | do | do | 35 (1½ hrs.). | do | 50 | 11,000 | 0.05 | −5 | 0 | 0 |
| IV | do | octadecene-1 (20 g.). | do | do | 55 (3 hrs.). | | ca. 100 | 21,400 | 0.01 | −5 | 0 | 5 |
| | | | | | | | | | 0.03 | −10 | −10 | 0 |
| | | | | | | | | | 0.05 | −15 | −20 | −10 |
| V | do | do | CS₂ (230 ml.). | do | 50 (2 hrs.). | 70 (1 hr.). | 100 | 12,000 | 0.01 | −10 | −10 | −10 |
| | | | | | | | | | 0.03 | −25 | −30 | −20 |
| | | | | | | | | | 0.05 | −35 | −35 | −25 |
| VI | 30,000 (25 g.). | octadecene-1 (60 g.). | o-dichlorobenzene (400 ml.) | AlCl₃ (25 g.). | 90 (2 hrs.). | 100 (1 hr.). | 100 | 2,450 | 0.01 | 0 | −5 | 15 |
| | | | | | | | | | 0.03 | −10 | −10 | 15 |
| | | | | | | | | | 0.05 | −20 | −20 | 15 |
| VII | 30,000 (8.3 g.). | hexadecene-1 (18.0 g.). | tetrachloroethylene (230 ml.) | AlCl₃ (8.3 g.). | 35 (2 hrs.). | 65 (1 hr.). | ca. 97 | 12,400 | 0.01 | −10 | 0 | 10 |
| | | | | | | | | | 0.03 | −20 | −15 | 5 |
| | | | | | | | | | 0.05 | −30 | −20 | 0 |
| VIII | 15,000 (8.3 g.). | do | do | do | do | do | 98 | 4,000 | 0.10 | 0 | 5 | 15 |
| IX | 30,000 (8.3 g.). | dodecene-1 (20 g.). | do | HF (8.3 g.). | −32 (2 hrs.). | 0 (1 hr.). | ca. 97 | 15,000 | (¹) | (¹) | (¹) | (¹) |
| X | 30,000 (12.5 g.). | polypropylene $C_{15}$–$C_{21}$ cut (40 g.). | o-dichlorobenzene (200 ml.). | AlCl₃ (5 g.). | 50 (2 hrs.). | 55 (1 hr.). | ca. 100 | 14,000 | (¹) | (¹) | (¹) | (¹) |
| XI | 30,000 (8.3 g.). | cracked wax olefins ($C_{10}$–$C_{20}$ cut) (20 g.). | tetrachloroethylene (230 ml.). | AlCl₃ (8.3 g.). | 35 (2 hrs.). | 60 (1 hr.). | ca. 100 | 37,500 | 0.01 | −5 | −5 | 5 |
| | | | | | | | | | 0.03 | −15 | −15 | −5 |
| | | | | | | | | | 0.05 | −20 | −20 | −20 |
| XII | do | cracked wax olefins ($C_{19}$ cut) (20 g.). | do | do | 50 (3 hrs.). | 70 (1 hr.). | 98 | 8,750 | 0.01 | −20 | −15 | −15 |
| | | | | | | | | | 0.03 | −25 | −35 | −25 |
| | | | | | | | | | 0.05 | −35 | −35 | −25 |
| XIII | do | cracked wax olefins ($C_{17}$–$C_{21}$ cut) (20 g.). | do | do | 30 (3 hrs.). | do | ca. 100 | 11,000 | 0.01 | −15 | −15 | −15 |
| | | | | | | | | | 0.03 | −25 | −35 | −20 |
| | | | | | | | | | 0.05 | −35 | −35 | −30 |

¹ No activity.

These alkylated polystyrene pour depressors are perfectly compatible with other pour depressors and other lubricating oil additives such as viscosity index improvers, corrosion inhibitors, detergents, oiliness agents and the like.

To summarize briefly, this invention relates to the preparation of lubricating oil additives having outstanding pour point depressor potency which are prepared by alkylating polystyrene in such fashion that the final product has a molecular weight within a range of from 6,000 to 18,000 Staudinger, a degree of alkylation of between 75% and 100% and which contain straight carbon chains having from 14 to 20 carbon atoms. In the preferred embodiment there are specific temperature limitations set forth, however, it is to be understood that these reaction conditions may be varied to obtain the desired final product.

What is claimed is:

1. A process for the preparation of lubricant additives having the desirable characteristics of depressing the pour point of waxy mineral lubricating oils with which they are blended which comprises dissolving polystyrene of a molecular weight within a range of from 25,000 to 45,000 in a non-reactive polar solvent selected from the class consisting of tetrachloroethylene, o-dichlorobenzene, carbon disulfide, p-dichlorobenzene, chlorobenzene, and nitrobenzene, adding thereto Friedel-Crafts catalyst, slowly adding to the mixture sufficient of an aliphatic monoolefin containing from 16 to 20 carbon atoms in a straight chain to alkylate said polystyrene to a degree within the range of from 75% to 100%, maintaining the reaction temperature between 30° and 75° F. for a period of time sufficient to form a product having a molecular weight within a range of from 6,000 to 18,000 Staudinger, and recovering the desired final product therefrom.

2. A process for the preparation of lubricant additives having the desirable characteristics of depressing the pour point of waxy mineral lubricating oils with which they are blended which comprises dissolving polystyrene of a molecular weight within a range of from 30,000 to 40,000 in a non-reactive polar solvent selected from the class consisting of tetrachloroethylene, o-dichlorobenzene, carbon disulfide, p-dichlorobenzene, chlorobenzene, and nitrobenzene, adding thereto solid aluminum chloride as a catalyst, slowly adding to the mixture sufficient of an aliphatic monoolefin containing from 16 to 18 carbon atoms in a straight chain to alkylate said polystyrene to a degree of alkylation within the range of from 75% to 100%, maintaining the reaction temperature between 30° and 75° F. for a period of time sufficient to form a final product having a molecular weight within a range of from 8,000 to 16,000 Staudinger and recovering the desired final product therefrom.

3. A process for the preparation of lubricant additives having the desirable characteristics of depressing the pour point of waxy mineral lubricating oils with which they are blended which comprises dissolving polystyrene of a molecular weight within a range of from about 30,000 to 40,000 in a non-reactive polar solvent selected from the class consisting of tetrachloroethylene, o-dichlorobenzene, carbon disulfide, p-dichlorobenzene, chlorobenzene, and nitrobenzene, adding thereto approximately an equimolar proportion of solid aluminum chloride as a catalyst, slowly adding to the mixture approximately an equimolar proportion of an aliphatic monoolefin containing from 16 to 18 carbon atoms in a straight chain to alkylate said polystyrene to a degree of alkylation within the range of from 75% to 100%, maintaining the reaction temperature between 30° and 75° F. for about ½ to 5 hours, and recovering therefrom a final product having a molecular weight within a range of from about 8,000 to 16,000 Staudinger.

4. A process for the preparation of lubricant additives having the desirable characteristics of depressing the pour point of waxy mineral lubricating oils with which they are blended which comprises dissolving a polystyrene of a molecular weight of about 30,000 in tetrachloroethylene, adding thereto an equimolar proportion of solid aluminum chloride, slowly adding to the mixture an equimolar proportion of octadecene-1, maintaining the reaction temperature at between 30° and 60° F. for about 1 to 3 hours, raising the reaction temperature to between 65° and 75° F. and maintaining the temperature at that level for about ½ to 2 hours, and recovering a final product having a molecular weight within a range of from about 8,000 to 16,000 Staudinger.

LESTER MARSHALL WELCH.

References Cited in the file of this patent

UNITED STATES PATENTS

| Number | Name | Date |
|---|---|---|
| 2,072,120 | Mikeska et al. | Mar. 2, 1937 |
| 2,507,338 | Heligmann | May 9, 1950 |
| 2,569,400 | Butler | Sept. 25, 1951 |

FOREIGN PATENTS

| Number | Country | Date |
|---|---|---|
| 640,567 | Great Britain | July 26, 1950 |